(12) United States Patent
Shen

(10) Patent No.: US 6,633,673 B1
(45) Date of Patent: Oct. 14, 2003

(54) FAST FADE OPERATION ON MPEG VIDEO OR OTHER COMPRESSED DATA

(75) Inventor: Bo Shen, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/335,462

(22) Filed: Jun. 17, 1999

(51) Int. Cl.[7] .................................................. G06K 9/36
(52) U.S. Cl. ....................... 382/232; 382/235; 382/236; 382/238
(58) Field of Search .................................. 382/232, 236, 382/238, 251, 250, 235; 348/595; 375/240.04, 240.2; 345/629, 634

(56) References Cited

U.S. PATENT DOCUMENTS

| | | | | |
|---|---|---|---|---|
| 5,231,484 A | * | 7/1993 | Gonzales et al. | 358/133 |
| 5,408,274 A | | 4/1995 | Chang et al. | 348/700 |
| 5,434,590 A | * | 7/1995 | Dinwiddie, Jr. et al. | 345/115 |
| 5,521,643 A | * | 5/1996 | Yim | 348/419 |
| 5,521,978 A | * | 5/1996 | Oguro | 380/10 |
| 5,526,017 A | * | 6/1996 | Wilkie | 345/115 |
| 5,654,759 A | * | 8/1997 | Augenbraun et al. | 348/405 |
| 5,708,732 A | | 1/1998 | Merhev et al. | 382/232 |
| 5,771,316 A | * | 6/1998 | Uz | 382/239 |
| 5,883,672 A | * | 3/1999 | Suzuki et al. | 348/405 |
| 6,040,875 A | * | 3/2000 | Boice et al. | 348/595 |
| 6,125,147 A | * | 9/2000 | Florencio et al. | 375/240.29 |
| 6,327,390 B1 | * | 12/2001 | Sun et al. | 382/235 |

OTHER PUBLICATIONS

Bo Shen, Ishwar K. Sethi and V. Bhaskaran, "Closed–Loop MPEG Video Rendering," Proc. IEEE Conf. Multimedia Computing and Systems, Ottawa, Canada, Jun., 1997.

Brian Smith and Larry Rowe, "Algorithms for Manipulating Compressed limages," IEEE Computer Graphics and Applications, pp. 34–42, Sep., 1993.

A. C. Hung and T. H. Meng, "Statistical Inverse Discrete Cosine Transforms for Image Compression," Proc. SPIE Electronic Imaging, vol. 2187, pp. 196–205, 1994.

S. F. Chanf and D. G. Messerschmitt, "Manipulation and Compositing of M C–DCT Compressed Video," IEEE JSAC Speial Issue on Intelligent Signal Proessing, vol. 13, No. 1, pp. 1–11, Jan., 1995.

B. Shen and I. K. Sethi, "Convolution–Based Edge Detection for Image/Video in Block DCT Domain," Journal of Visual Communication and Image Representation, vol. 7, No. 4, pp. 411–423, Dec., 1996.

Bo Shen and Ishwar K. Sethi, "Inner–Block Operations on Compressed Images," Vision and Neural Networks Laboratory, Department of Computer Science, Wayne State University, pp. 489–498, 1995.

* cited by examiner

Primary Examiner—Anh Hong Do

(57) ABSTRACT

A method and apparatus for receiving and processing compressed data, such as video or audio data, in a compressed domain. An exemplary preferred embodiment of the method and apparatus is embodied in a digital video editor programmed to determine appropriate sizes of amplitude adjustment steps to be directly applied to the compressed data in consideration of temporal dependencies of the compressed data. For a fade-out operation, DC coefficients are stepped down such that pixels of an image reproduced from the compressed data fade in a uniform manner; at the end of the DC fade-out, AC coefficients are then disabled. A preferred embodiment of the method and apparatus also provides compensation for quantization variations and operates in consideration of syntax particular to a compression standard with which the compressed data are compliant.

11 Claims, 7 Drawing Sheets

$l_1$ – LIGHTER
$l_2$ – LIGHT
$l_3$ – DARKER
$l_4$ – DARKEST

FAST FADE OPERATION ON MPEG VIDEO OR OTHER COMPRESSED DATA

BACKGROUND OF THE INVENTION

1. Field of the Invention

The present invention relates to a method and apparatus for processing compressed data and, for example, a method and apparatus for directly modifying transform coefficients associated with blocks of the compressed data in a transform-domain in consideration of temporal dependencies of the compressed data.

2. Description of the Related Art

As with many of today's technologies, the current trend in image sequence developing and editing is to use digital formats. Even with motion picture film, editing of image sequences (including image splicing, color processing, and special effects) can be much more precisely accomplished by first converting images to a digital format, and performing desired edits upon the digital format. If desired, images can then be converted back to the original format.

Unfortunately, digital formats usually use enormous amounts of memory and transmission bandwidth. A single image with a resolution of 200×300 pixels can occupy megabytes of memory. When it is considered that many applications (for example, motion picture film processing) require far greater resolution, and that image sequences can include hundreds or thousands of images, it becomes very apparent that many applications are called upon to handle gigabytes of information, creating a bandwidth problem, in terms of computational and transmission resources.

To solve the bandwidth problem, standards have been proposed for image compression. These standards generally rely upon spatial or temporal redundancies which exist in one or more images.

A single image, for example, may have spatial redundancies in the form of regions having the same color (intensity and hue); a single, all blue image could potentially be represented simply by its intensity and hue, and information indicating that the entire frame has the same characteristics.

Temporal redundancies typically exist in sequences of images, and compression usually exploits these redundancies as well. For example, adjacent images in a sequence can be very much alike; exploiting redundancies, a compressed image sequence may include data on how to reconstruct current image frames based upon previously decoded frames. This data can be expressed as a series of motion vectors and difference information. To obtain this information, pixels in the second frame are grouped into image squares of 8×8 or 16×16 pixels ("blocks" of pixels), and a search is made in a similar location in a prior frame for the closest match. The motion vectors and difference information direct a decoder to reconstruct each image block of the second frame by going back to the first frame, taking a close match of the data (identified by the motion vector) and making some adjustments (identified by the difference information), to completely reconstruct the second frame.

One group of standards currently popular for compression of image sequences has been defined by the Moving Pictures Experts' Group, and these standards are generally referred to as "MPEG." The MPEG standards generally call for compression of individual images into three different types of compressed image frames: compressed independent ("I") frames exploit only spatial redundancies, and contain all the information necessary to reconstruct a single frame; compressed prediction ("P") frames exploit temporal redundancies from a prior frame (either a P or I frame) and typically only require about ⅓ as much data as an I frame for complete frame reconstruction; and compressed bi-directional interpolated ("B") frames can use data from either or both of prior and future frames (P or I frames) to provide frame reconstruction, and may only require ¼ as much data as a P frame. Other compression standards also rely upon exploitation of temporal image redundancies, for example, H.261 and H.263.

Compressed data such as video signals are often difficult to manipulate without having to decompress, perform an operation and recompress the data. For example, fade operations have typically been carried out on decompressed video. The fade operation is often used in video broadcasting. One typical example is that television (TV) stations splice in commercial clips during regular TV program broadcasting. An abrupt beginning of a commercial could annoy viewers; a gradual fade to the black of the immediately preceding video is much more preferred. The operation of gradually fading to black is called a "fade-out" operation. On the other hand, the operation of gradually fading from black to full or partial picture information is called a "fade-in" operation.

In digital TV broadcasting, regular TV programs (live or pre-recorded) are typically stored and transmitted in a compressed form. MPEG-2 is a compressed form used in many digital TV consortia such as HDTV or ATSC. A conventional way of performing fade on MPEG sequence is to decompress the sequence, apply the fading operation and recompress it back. Within this loop, costly DCT and motion estimation operations make it effectively impossible for real time applications. Therefore, a need exists for a fade technique applicable in the compressed domain to avoid these two bottlenecks.

Although it is known to implement operations directly on compressed JPEG data, see Brian Smith and Larry Rowe, "Algorithms For Manipulating Compressed Images," *IEEE Computer Graphics and Applications*, pp. 34–42, September 1993, there are problems, particularly with respect to MPEG. For example, since MPEG utilizes interframe coding, frames of a picture may be coded depending on one or two other frames. Also, within these pictures, different coding methods may apply on different types of macroblocks. Thus, a universal scheme for different types of macroblocks in different types of pictures is needed. Additionally, operation on DC coefficients can only change the brightness of the whole DCT block uniformly which may lead to a problem in a fade-out operation when the fade-out approaches black. It would be helpful to have an approximated method based on the consideration that the pictures are almost black when the macroblocks or other data in the fade-out operation approach black. Furthermore, considering the whole process within the MPEG context, the variable quantization used in MPEG may introduce error-accumulation problems. It would be helpful to improve the visual quality of the fade results, such as by a correction process.

SUMMARY OF THE INVENTIONS

The present inventions are directed to methods and apparatus for operating or modifying data, and especially compressed data, without having to decompress the data. They can do so even if there are temporal or spatial dependencies within the data, and even when the data is arranged in a format different than the format in which the data will ultimately be used, such as MPEG video data. In MPEG video, the data is stored in a different order than that in which it will be displayed. As a result, the data can be processed in the order in which it exists, such as in its storage form, rather than in its useful form, e.g. the display order. One particularly advantageous form of the invention is used to produce fade-in and fade-out operations on MPEG video, which is a relatively complicated compression data form. The data is stored as frames of data in one order and displayed as frames of data in another form and in another order. Moreover, the frames of data in the stored format are not complete in and of themselves and depend for their completeness for display purposes on data contained in other frames of stored data. Furthermore, the dependencies on data in other frames apply not only to data in previous frames but also to data in frames displayed subsequently. Several aspects of the present inventions account for these dependencies. However, it can also operate on more simple forms of compressed data.

In an exemplary preferred embodiment, methods and apparatus are provided for a fade operation on MPEG video or other compressed data wherein either one or both of the following occur: (1) the fade or other operation can be done regardless of temporal dependency in the MPEG sequence, and therefore, the whole video can be processed if desired sequentially as it is read in; and (2) the DC manipulation concerns as little as one coefficient in a DCT block and therefore the process is fast and easy. These two advantages allow MPEG streams to be processed in a streamline fashion while avoiding bottleneck operations in DCT and motion estimation.

In accordance with one aspect of the present inventions, an apparatus and method are provided for modifying characteristics of a sequence of data, preferably representing compressed data. Preferably, a sequence of data is received representing compressed data and which includes a selected characteristic to be modified. The compressed data may include information representing motion estimation for purposes of compressing the data. A value is assigned for making at least one modification to the selected characteristic, and the value assigned can vary as a function of the temporal dependencies within the compressed data. In a preferred embodiment, the data can be processed in the sequence in which it is received, and the data can be processed without decompressing the data and without changing the sequence of the data.

In one preferred form of the invention, the apparatus and method operate on data that are grouped in distinct groups or packets, such as frames or video picture frames, and the data in one frame may depend upon the data in one or more other frames. Additionally, the dependence upon data in other frames may include dependence on later frames as well as earlier frames of data. In the context of compressed video data relying upon temporal dependencies and motion estimation, such as MPEG video, the data can still be processed in its storage order while still taking into account the temporal dependencies among and between frames. In one aspect of the present inventions, operations on the data are made as a function of the type of video block involved, whether independent, predicted or bidirectional, and whether the macro block is forward predicted, backward predicted or both. One form of the inventions is particularly suited to fade operations on compressed video data, for example by modifying a DC component of the compressed video.

In accordance with a further specific illustrative embodiment of one aspect of the present inventions, a method of manipulating characteristics of a reproduced sequence of data while the data is in a compressed format includes the steps of: receiving a compressed data sequence; determining sizes of quantized magnitude adjustment steps for blocks of the compressed data sequence depending upon temporal dependencies of the compressed data sequence; and applying the quantized magnitude adjustment steps to a component value of the compressed data stream representing a characteristic of the data for more than one block, without having to decompress the data to apply the modification individually to all of the individual elements of the data. In the example of compressed data in the discrete cosine transform ("DCT") domain, this component value representing a characteristic of the data is the DC coefficient, and the fade_step is applied to the DC coefficient in the compressed data sequence.

Applying the fade_step to the DC coefficient of the compressed block permits modification or changing of the characteristics of all of the pixels in the block without decompressing all of the data to do so.

In a fade application, one or more anomalies may arise, for which adjustments may be desirable. For example, because approximations may carry over from one frame or block to another, anomalies may propagate. Therefore, in a further aspect of the present inventions, the process may further include the steps of determining quantization variations associated with the quantized magnitude adjustment steps and changing subsequent magnitude adjustment step sizes in consideration of the quantization variations.

In another aspect of the present inventions, an apparatus includes means for determining sizes of quantized magnitude adjustment steps for blocks of a compressed data sequence in consideration of temporal dependencies of the compressed data sequence. Means may also be included for applying the quantized magnitude adjustment steps to the compressed data sequence. Quantization variations associated with the quantized magnitude adjustment steps are determined and the subsequent magnitude adjustment step sizes are changed in consideration of the quantization variations. This may be a beneficial way of book keeping and correcting any error that may arise because of quantization variations.

In another aspect of the present inventions, an apparatus operative to receive, process and output compressed data includes: machine readable media; and instructions stored on the machine readable media that instruct a machine to receive blocks of compressed data compliant with a data compression standard, determine sizes of quantized magnitude adjustments steps for the blocks depending upon temporal dependencies of the compressed data, apply the quantized magnitude adjustment steps to the compressed data, determine quantization variations associated with the quantized magnitude adjustment steps, adjust subsequent magnitude adjustment steps in consideration of quantization variations, and provide an output of compressed data compliant with the data compression standard.

In a further aspect of the present inventions, the instructions instruct the machine to repeatedly apply the quantized magnitude adjustment steps to change a characteristic (e.g., intensity) of a reproduced video image derived from the output of compressed data in a uniform manner. For example, the quantized magnitude adjustment steps are applied to fade-out or fade-in the video image.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

One or more of the present inventions can be used for a number of applications for operating on data without having to change the order of the data or without having to decompress the data, for example. In several forms of the inventions, they allow the data to be processed, for example to edit or modify the data, in a first in, first out, or streamlined, basis. The inventions are particularly useful for editing, adding information to or removing information from compressed or other processed data, such as video or audio information. They are especially effective on data that are arranged in blocks, such as frames of data, and on data where the data for one frame are dependent on data in another frame, when the data are ultimately used for the intended purpose, such as display of picture information. For example, they can be used for editing compressed video to change the characteristics of the video without first decompressing the video. In one situation, certain components in the compressed video can be modified so that when decompressed, the picture will fade to black, or conversely, so that the video will fade from black to full luminance and chrominance. The first process is a fade-out and the second process is a fade-in.

These processes can also be used as parts of overall methods of inserting into or deleting from video and/or audio signals one or more segments of other video and/or audio. For example, certain components in the compressed data can be modified while still in the compressed format, so that other data can be inserted or removed, without losing or unacceptably altering the original information when reconverted to the uncompressed format. For example, the first step could be a fade-out followed by insertion of new data having a fade-in at the beginning and a fade-out at the end, followed by a fade-in operation back to the original data in the sequence. These editing steps can all be done while the data is still in the compressed format. Consequently, such editing, insertion or deletion can be accomplished without the time consuming and often prohibitive decompression of the original data stream and subsequent recompression of the modified data stream.

While the following examples will be described in the context of fade-out and fade-in, it should be understood that the same or similar principles can be applied to adding, deleting or changing data in the compressed format. The following description of the preferred embodiments is intended to be illustrative only for considering the concepts of the present inventions.

Figure 1:
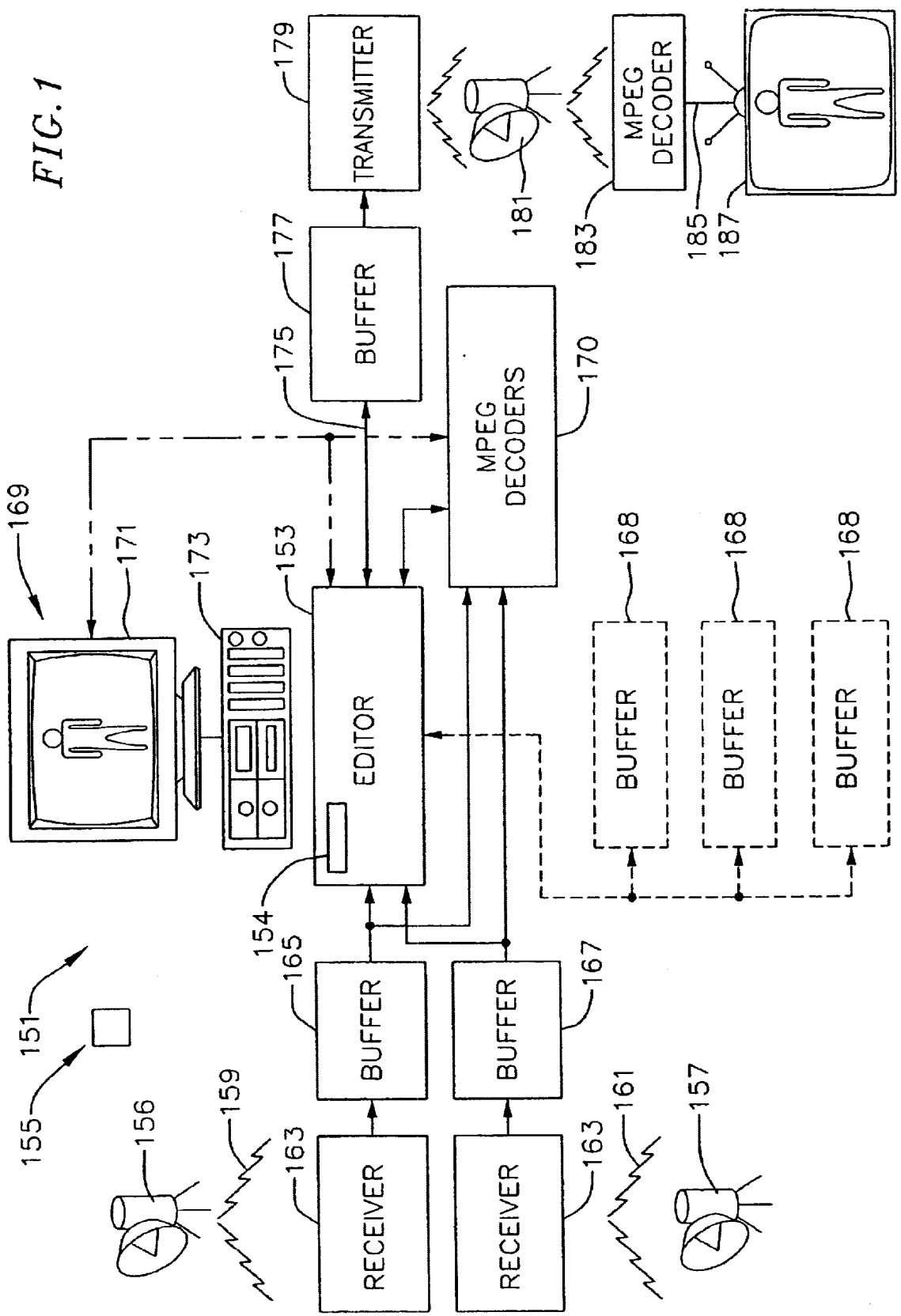
FIG. 1 is an illustrative diagram showing an application for the principles of the present invention, namely a real-time system for cutting and splicing together two satellite feeds, and forming a composite feed for retransmission to a satellite, such as might be performed by a television network.

FIG. 1 illustrates a typical application 151 for an editor 153 which implements principles of the present invention, such as, a real-time application which involves fading-out and/or fading-in compressed signals from a satellite feed. The editor 153 preferably includes a media reading and writing device 154 (such as a disk drive) which serves as an interface for receiving and/or sending instructions encoded on a storage medium 155 (such as a floppy disk.) It should be understood, however, that the principles of the present invention are not limited to video editors and are equally applicable to other formats such as audio. Furthermore, the media reading device 154 can be replaced by an interface (such as a modem) providing the editor 153 with access to remotely stored instructions or other control software and a receiving unit for receiving data and/or instructions.

The system illustrated in FIG. 1 includes two satellites 156 and 157 which transmit two different compressed image signals, for example, two different sports games compressed in a discrete cosine transform (DCT) format. The transmissions, represented by reference numerals 159 and 161, are received by one or more receivers 163 and fed to corresponding input buffers 165 and 167. Without leaving the compressed domain, or performing an inverse discrete cosine transform ("IDCT"), the preferred editor 153 operates under the control of a user interface 169, to mix or otherwise modify the two compressed image signals as desired. Preferably, the system includes (in parallel with the editor and associated buffers 168) one or more MPEG decoders 170 which are used to display images using the user interface or some other interface. For example, the user interface can include one or more processors, monitors 171 and keyboards 173, and can concurrently display several image windows such as one corresponding to each transmission 159 and 161, as well as to an output 175 of the editor. These monitors are used to view the incoming video streams if desired during the editing process, as well as the output video stream. However, it should be understood that the processing of the video signals can be carried out, and are carried out most efficiently, while still in the DCT or other compressed domain. With the user interface, a person controlling the editor 153 can cause the editor to switch the output between several image signals, such as between the two sports games, or to mix commercials with a live satellite transmission, employing fade-out and fade-in operations or other operations as desired.

The output 175 is fed to an output image buffer 177, and from there to a transmitter 179 for transmitting a composite satellite signal 180 to satellite 181. The signal can then be received by a local company receiving station, and transmitted via cable 185 or otherwise to individual television subscribers, represented by the reference numeral 187.

It should be understood that the application just discussed, which involves satellite feeds, is but one application for the preferred editor. It may be applied elsewhere as well, for example, in post-production houses, or as software for use upon individual personal computers for graphics or video conferencing applications. The preferred embodiments will now be discussed in additional detail.

By way of overview, an addition-based fade process is first described, then the subject of temporal dependencies within MPEG to decide the fade step size for different types of macroblocks in different types of pictures is considered. After the discussion on DC manipulation approximation, a quantized fade step size that can be applied directly on quantized DC is derived. A bookkeeping scheme to reduce the accumulated error introduced by the quantization is also discussed.

Fade Step Size

An exemplary preferred embodiment of the present invention employs an addition-based fade scheme but other operations such as other fade schemes are possible. In an example of a fade out, starting from a frame at time "t", the intensity of each pixel in a frame at time t+1 is decreased by s, and the intensity of each pixel in a frame at time t+2 by 2s and so on. That is, the fade-out step size is s. As stated above, this is an addition-based scheme and differs from a multiplication-based scheme in which starting from a frame at time t, the value of each pixel is multiplied by $\beta$ varying from 1.0 to 0.0 on a frame by frame basis. The multiplication-based scheme is less desirable because pixel values in a picture may be decreased by different amounts. If there are inter-dependencies between pictures, the reference pictures must be reconstructed to achieve the fade-out operation. Since the addition-based fade-out preferably has all pixel values in a picture undergo the same amount of reduction, it allows for the advantageous use of temporal dependencies and application of the fade-out on differentially coded data. The addition-based scheme therefore simplifies the operation and results in a frame-independent operation on MPEG sequences. The addition-based scheme also applies to a fade-in operation to simplify operation and results in a frame-independent operation on MPEG sequences, as well. Therefore, for the nth frame in the sequence undergoing the fade, the pixel value after the fade operation should be (EQ. 1)

$$f'(i,j) = f(i,j) + n \times s.$$

This indicates that all pixels $f(i,j)$ in the original picture $f$ are modified uniformly by the fade step size multiplied by the position of the picture in the fading sequence relative to the picture for which the fade first started, to generate the faded version $f'$. There may be different ways to define this relative position in a fade or other operation, as will be seen below. For example, the relative position will be defined for a fade-in operation by one method, such as counting (n) down, and will be defined for fade-out by another operation, such as counting (n) up. These examples will be discussed in more detail below.

Figure 2:
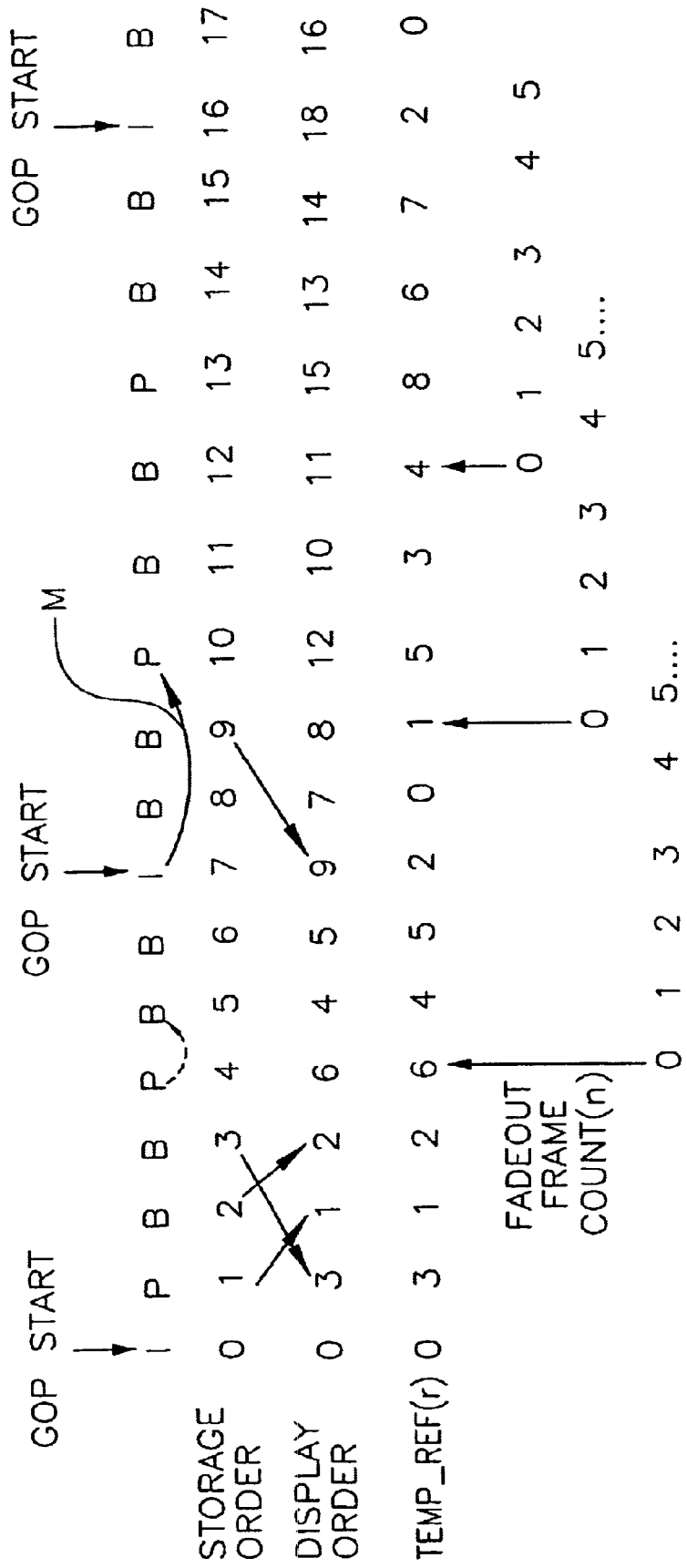
FIG. 2 illustrates the process for deciding fade step size for I-, P- and B-pictures according to an exemplary preferred embodiment of the present invention.

MPEG uses different types of coding at picture as well as macroblock level. In the following discussion, fade_step for each type of macroblock in different types of pictures is derived with an example provided. FIG. 2 shows some examples of scenarios for a fade-out operation starting at different places within an MPEG sequence containing I-, P- and B-pictures. In this case, the number of pictures within a group of picture ("GOP") is N, and the distance between a predicted frame and its reference frame, such as between an I-picture and a P-picture or between a P-picture and a P-picture, is M. In FIG. 2, N=9 and M=3, in the second GOP depicted. The parameter M is useful in indicating the dependence of one frame on another, and it is also useful in adjusting the value of the fade_step, the value that is used to modify or edit the data. In other applications, M or an equivalent parameter can be used to track the dependencies between blocks or frames of data, or to adjust for differences between the storage order and the use order (display order in MPEG video), for example.

The fade-out frame count n starts from 0 (no fade-out occurs when n=0), and for any frame afterwards, the fade-out amount is ns. In FIG. 2, there are shown three examples of where a fade-out process may start, one starting at frame 4 (shown by the arrow up from the sequence 0, 1, 2, 3, 4, 5 . . . ), one at frame 9 and one at frame 12. Other starting points are possible as well.

For intra macroblocks (either in intraframes or interframes), since they are coded independently, a fade_step=n×s is applied directly. However, due to the fact that an I-or P-picture may be displayed after some B-pictures but the store of it is in front of the B-pictures (compare "storage order" with "display order" in FIG. 2), the fade_step is adjusted accordingly. By doing so, the picture frames can be processed in the order in which they are stored, or in other words in the order in which they may be received by an editor or other processor. As a result, the processor does not need to take in a series of pictures and operate on them in display order, and then reassemble them into the storage order for storage or retransmission. Instead, the processor can operate on them in the storage order and store the modified data or retransmit the modified data in the same order as it was received and as it was processed. MPEG uses a ten-bit syntax—temporal reference "temp-ref" (r) in the picture header to define the order in which the picture is to be displayed within a GOP. As defined in the MPEG Standards, the temporal_reference is an unsigned integer associated with each input picture. (See FIG. 2.) For the earliest picture (in display order) in each group of pictures, the temporal_reference is reset to zero. It is incremented by one, modulo 1024, for each input picture. The temporal_reference is assigned (in sequence) to the pictures in display order. No temporal_reference is omitted from the sequence. This syntax is used in deciding fade_step while the stream is parsed in its storage order.

When referring to I-pictures, a variable which will be called $r_I$ is used to indicate an I-picture's temporal reference (its actual display order within the GOP). The variable $r_I$ will be used to adjust the fade_step for a particular frame either upward or downward an amount as a function of how far away its storage position is from its display position. In other applications, it may be used to adjust a value to be applied for changing or otherwise modifying the data as a function of temporal dependencies, or as a function of other differences between frame storage and its ultimate use. The value of $r_I$ can also be predicted—either 0 for the first GOP (assuming a sequence starts with an I-picture) or M−1 for subsequent GOPs. For intra macroblocks in P- and B-pictures, the following two observations allow their fade step sizes to be determined: (1) a P-picture is always displayed M−1 frames later relative to its storage order; and (2) a B-picture is always displayed one frame earlier relative to its storage order.

MPEG uses prediction in P-pictures and bi-directional interpolation in B-pictures. For data in macroblocks, predicted blocks depend on blocks in a past picture and interpolated blocks depend on blocks in either or both past and future pictures. These macroblocks are coded in the form of motion vectors and residual data. The methods and apparatus of the present inventions may use these dependencies advantageously for applying the fade-out on the residual data directly without having to unravel the picture sequence. The difference between the display order and storage order is also considered. A variable which will be designated $r_M$ is used to indicate the relative display order of B-pictures within their reference pictures (distance M). It is defined as r % M for the first GOP and (r % M+1) for the rest of the GOPs. "%" is a modulus operator. As with the variable $r_I$, the variable $r_M$ will be used to adjust the fade_step for a particular frame either upward or downward an amount as a function of how far away its storage position is from its display position. Additionally, in other applications, it may be used to adjust a value to be applied for changing or otherwise modifying the data as a function of temporal dependencies, or as a function of other differences between frame storage and its ultimate use.

By considering the temporal and/or spatial dependencies between frames, compressed data can be manipulated without decompressing the data beforehand. For example, video data in an MPEG compressed format or in other motion compensation or motion estimation formats can be processed by using one or more relationships that repeat or can be predicted according to the way the original video data is compressed. Certain characteristics of the data are known, such as the existence of predicted blocks and bi-directional blocks, and their relationships will be known either from the standards established for the compression or in other ways, such as from information contained in the picture header. With this information, and knowing the operation to be carried out on the compressed data such as a fade-in or fade-out, a processor or other equipment can operate or be programmed to modify or change the data in a first-in, first-out or streamlined sequence. The data can be changed in this way without decompressing the data and without waiting to modify the data in its display order. The data can be modified in its storage order.

Table 1 (below) summarizes the relationships developed for MPEG video. It gives a solution of fade_step for different types of macroblocks in different types of pictures in an MPEG sequence (assume consistent N and M values throughout the MPEG sequence; if not, they can be evaluated on the fly). "F only" indicates the macroblock is forward-predicted. Non-intra macroblocks which are differentially coded (mb_type=2 or 18, where only MB_PATTERN bit is set) fall into the category of "F only" with zero-valued motion vectors. "B only" indicates that the macroblock is backward predicted. "F and B" indicates that the macroblock is interpolated, therefore contains both forward and backward motion vectors. According to the MPEG standard, in interpolated pictures, if a macroblock is skipped, it has the same macroblock type as that of the prior macroblock, therefore, the operation on it depends on whether the prior macroblock is "F only", "B only" or "F and B".

TABLE 1

Fade- step size for different types of macroblock

| | I Picture | P Picture | B Picture |
|---|---|---|---|
| Intra | $-(n + r_I) \times |s|$ | $-(n + M - 1) \times |s|$ | $-(n - 1) \times |s|$ |
| F only | | $-M \times s$ | $-r_M \times s$ |
| B only | | | $+(M - r_M) \times s$ |
| F and B | | | $+(M - 2r_M) \times s/2$ |
| Skipped | | $-M \times s$ | Same as F or B or F and B in B picture |

The value of s, the fade step size, can be either positive or negative, and can even vary with time. Moreover, the value of s can be varied spatially in other ways, such as by applying selected factors by multiplication or addition, to have the picture change in a desired manner. For example, the fade could occur faster at the top or other part of the picture. Additionally, the effect represented by the parameter s could be special effects or the like.

In the context of s representing fade, and coupled with the counting order of "n", either fade-out or fade-in can be achieved. Denoting m as the total number of pictures involved in fading, fade-in can be achieved by setting a negative value for s (s<0), and counting n decrementally from m to 1, that is, n=m, m-1, . . . . , 2, 1. The parameter m also indicates how long the fade will last, and is typically determined by the operator in any number of ways, such as by inputting a value for the time of the fade start or as the frame location and length of time for the fade. Conversely, fade-out is achieved by setting a positive value for s (s>0), and counting n incrementally from 1 to m, that is, n=1, 2, . . . m-1, m. In the preferred embodiment, the value of m is decided by t, the intended time for the fading (seconds), and the frame_rate, the number of frames per second of the video sequence. That is, m=t*frame_rate.

As shown in Table 1, the value of the reference distance M is used to decide the fade step size for P- and B-pictures. The value equals one plus the number of pictures between two consecutive reference pictures, in display order. For an MPEG video sequence, M can be obtained by the following procedure:

1. When an I-picture is reached, and if it is not the earliest picture in a sequence, the value of M equals one plus the temporal_reference (described above) of the I-picture. No further processing is carried out. If the I-picture is the first picture, the procedure continues to the next step after looking for a P picture.

2. When a P-picture is reached, record its temporal_reference.

3. Compare the number recorded in step 2 with the temporal_reference of the immediately previous reference frame (either I or P) in storage order, and the difference is M. The value of M is then used to decide the fade_step size for P- and B-pictures, as shown in Table 1.

This value of M can be used in deciding the fade step size in subsequent pictures of the video sequence. However, if the GOP structure varies within the sequence, this 3-step process is repeated whenever a reference picture is reached to obtain M on the fly. When M is defined as the distance between a predicted frame and its reference frame (especially when viewed from the point of view of a decoder), such as the distance between a forward predicted frame and its reference frame, the distance relationship can be used in other motion predicting compression and data formats to operate on the data in the storage order and without decompressing the data.

DC Manipulation

Given one or more relationships between the pictures or other data to be modified or processed, and one or more parameters that can be used to modify or process the data, one or more characteristics or features of the data can be modified without decompressing the data. For example, in one preferred procedure according to one aspect of the present inventions, the parameters can be used to vary the brightness of the pictures by varying the DC component of the compressed MPEG video, even though there may be temporal dependencies between various DC components. For example, the fade_step derived above can be applied to DC coefficients in a fade_out operation, as discussed below. Moreover, the operation can be carried out on the data as stored as opposed to in the display order.

Decreasing the value of every pixel in a block by amount fade_step is equivalent to decreasing the value of the DC coefficient of the discrete cosine transform ("DCT") of the block by 8×fade_step. Since it is not possible to code "darker than black" DC coefficients, this introduces an approximation when the fading approaches its end. To illustrate this, consider the following DCT block. Pixel values are normalized to [−128, 127] before DCT in intrablock coding (Matrix 1).

$$\begin{bmatrix} -944 & -36 & -2 & -4 & 0 & -4 & 0 & 0 \\ 386 & 6 & -4 & -2 & -3 & 0 & 0 & 0 \\ -76 & 42 & -4 & 4 & 0 & 0 & 0 & 0 \\ -96 & -18 & -2 & -4 & 0 & 0 & 0 & 0 \\ 39 & -24 & -8 & 0 & 0 & 0 & 0 & 0 \\ 20 & 20 & 0 & 0 & 0 & 0 & 0 & 0 \\ -15 & 5 & 7 & 0 & 0 & 0 & 0 & 0 \\ 0 & -12 & 0 & 0 & 0 & 0 & 0 & 0 \end{bmatrix}$$

This is a block with fairly high AC energy. With a fade-out step size of −10, for example, what applies on DC coefficient is −80 because of DCT yielding (Matrix 2)

$$\begin{bmatrix} -1024 & -36 & -2 & -4 & 0 & -4 & 0 & 0 \\ 386 & 6 & -4 & -2 & -3 & 0 & 0 & 0 \\ -76 & 42 & -4 & 4 & 0 & 0 & 0 & 0 \\ -96 & -18 & -2 & -4 & 0 & 0 & 0 & 0 \\ 39 & -24 & -8 & 0 & 0 & 0 & 0 & 0 \\ 20 & 20 & 0 & 0 & 0 & 0 & 0 & 0 \\ -15 & 5 & 7 & 0 & 0 & 0 & 0 & 0 \\ 0 & -12 & 0 & 0 & 0 & 0 & 0 & 0 \end{bmatrix}$$

with its IDCT version being (Matrix 3)

$$\begin{bmatrix} -87 & -82 & -79 & -79 & -79 & -81 & -83 & -84 \\ -82 & -79 & -78 & -78 & -78 & -78 & -80 & -80 \\ -74 & -74 & -76 & -79 & -77 & -75 & -73 & -71 \\ -97 & -93 & -88 & -85 & -81 & -78 & -76 & -73 \\ -169 & -160 & -150 & -139 & -128 & -120 & -112 & -105 \\ -193 & -191 & -190 & -189 & -187 & -184 & -178 & -172 \\ -191 & -190 & -192 & -192 & -191 & -194 & -195 & -193 \\ -191 & -192 & -193 & -192 & -189 & -190 & -192 & -192 \end{bmatrix}$$

Most values in the last four rows of Matrix 3 are smaller than −128 (pixel value 0 if inverse normalized), which will be painted as black pixels. But the values in the first four rows are not; they are painted as pixels with some luminance. Ideally, for the next picture in the fade-out sequence the DC coefficient should be reduced to −1104, the IDCT version becomes (Matrix 4)

$$\begin{bmatrix} -112 & -107 & -104 & -104 & -104 & -106 & -108 & -109 \\ -107 & -104 & -103 & -103 & -103 & -103 & -105 & -105 \\ -99 & -99 & -101 & -104 & -102 & -100 & -98 & -96 \\ -122 & -118 & -113 & -110 & -106 & -103 & -101 & -98 \\ -194 & -185 & -175 & -164 & -153 & -145 & -137 & -130 \\ -218 & -216 & -215 & -214 & -212 & -209 & -203 & -197 \\ -216 & -215 & -217 & -217 & -216 & -219 & -220 & -218 \\ -216 & -217 & -218 & -217 & -214 & -215 & -217 & -217 \end{bmatrix}$$

The values in the last four rows are now all smaller than −128, so they will be painted as black pixels. The values in the first four rows are now smaller, but still larger than −128, which indicates that they are pixels with some luminance. However, the DC coefficient with the value of −1104 can not be coded because it is smaller than the coding lower bound.

Accordingly, an exemplary preferred embodiment of the present invention employs a procedure to set all AC coefficients to a lower bound such as zero when a DC value has reached its lower bound. Once the lower bound is reached, the AC values in the picture are set to zero and the DC value reached at that point is maintained. The block is then rendered as a homogeneously black block. Comparing to the ideal case, the first four rows of the block are brought directly to black as opposed to another intermediate luminance level. This is an approximation. However, since the pictures are already approaching black, this approximation does not introduce visual unpleasantness in most cases. Furthermore, when the fade-out effect is started, it is usually at the end of a scene where there is not so much activity on the screen. In such a case, the non-intra coded picture has very low AC energy. This further reduces the approximation error. It should be noted that some or all of the AC values can be set to some other value than zero, to produce effects other than a fade to black, but the procedure has particular application to fade-out. By specifying the fade step size and how long it would last, the fade-out can stop when the frame intensity is not completely black.

In the case of a fade-in operation, the same effects typically do not arise. Therefore, this process of setting the AC coefficients to zero is generally not used in the fade-in process.

It will also be apparent that characteristics of the compressed video other than the DC coefficient can be manipulated, as well, given that the temporal dependencies between frames can be defined. For example, picture content and spatial relationships can be manipulated as well.

Quantization and Error-Accumulation

Recall that the DC values retrieved from the streams are their quantized value. According to one aspect of the present inventions, the fade_step is quantized so that it can be applied directly on the quantized DC coefficients. In other words, the fade_step is quantized the same way as the corresponding DC coefficient so that the adjustment can be applied directly, without converting the DC coefficients to any significant degree.

A variable, fade_amt, is defined as the quantized fade_step. Two cases for intra macroblocks and non-intra macroblocks, respectively, are considered below. (1) Since DC coefficients of all blocks in intraframes and DC coefficients of all intra macroblocks in interframes are quantized uniformly by 8 (in 8 bit mode), the fade amount applied on quantized DC coefficients should be fade_amt=8×fade_step/8=fade_step. The quantization in this case does not introduce any error. (2) Since the quantization of DC coefficients of blocks in an interframe depends on Mquant, or $M_q$,(which could vary on macroblock level) and on the (0, 0) entry of the interframe quantization table, this may result in possible quantization error in interframes. The fade amount on quantized DC coefficients is governed by the following equation (EQ. 2):

$$\text{fade\_amt} = \text{round\_off}\left(\frac{\text{round\_nearest}(16 \times (8 \times \text{fade\_step})/Q_N(0, 0))}{2M_q}\right).$$

Figure 3:
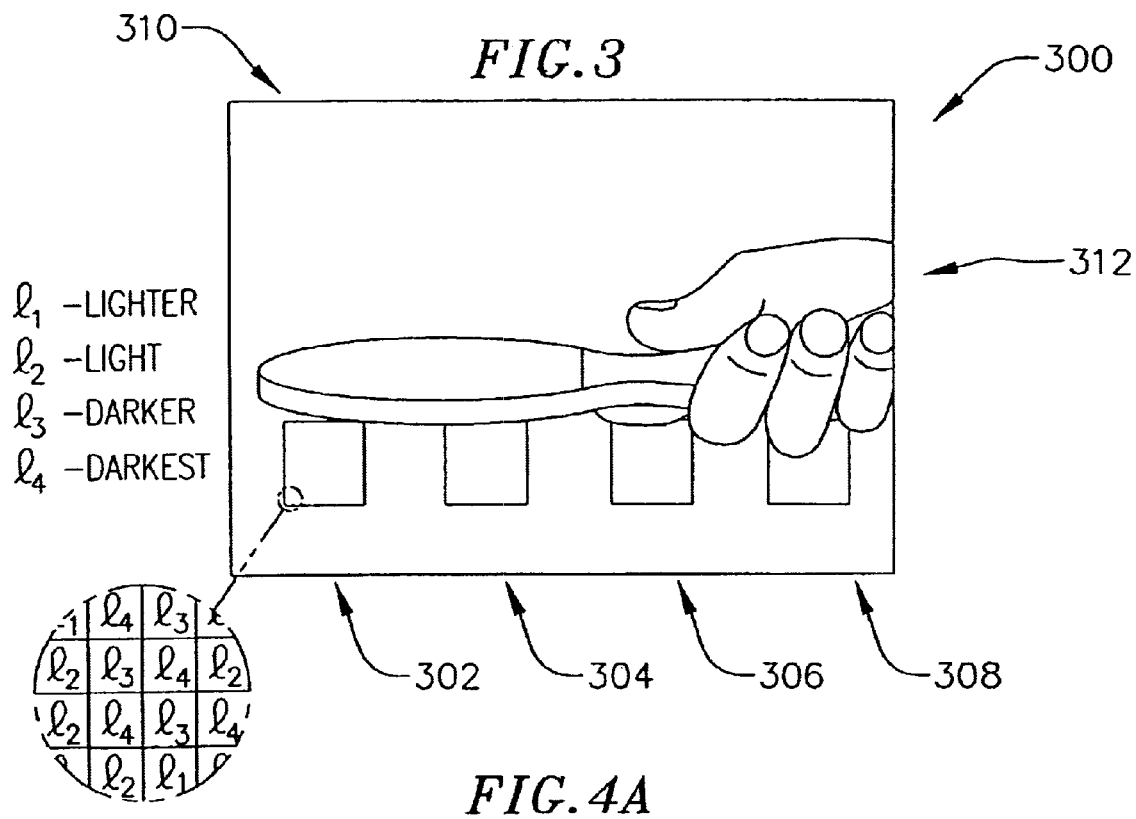
FIG. 3 illustrates accumulated error in quantized fade step size which the present invention provides error correction to eliminate.

$Q_N$ is the quantization table used for non-intra frames. The division and round operation in the above equation typically results in error. In fact, this error may be accumulated along the fade process until an intra macroblock is encoded. Due to this variable quantization, pixels within a picture may undergo different fade amounts. This is inconsistent with a desire to decrease or increase the luminance of all of pixels in a picture by the same amount. Consequently, this may affect other pictures that are coded using such a picture as a reference, and therefore leads to additional errors in other pictures. For example, FIG. 3 shows a detail 300 of a frame (B-picture) from a table-tennis sequence after applying the fade-out process without controlling the error discussed above. Four macroblocks 302, 304, 306, 308 underneath the paddle 310 and hand 312 show relatively lower luminance. A parsing on macroblock headers revealed that these blocks were intra-coded, which indicates that their fade_amts are correct. However, their surrounding blocks appear brighter since the error caused by the round_off operation gets accumulated.

Figure 4A:
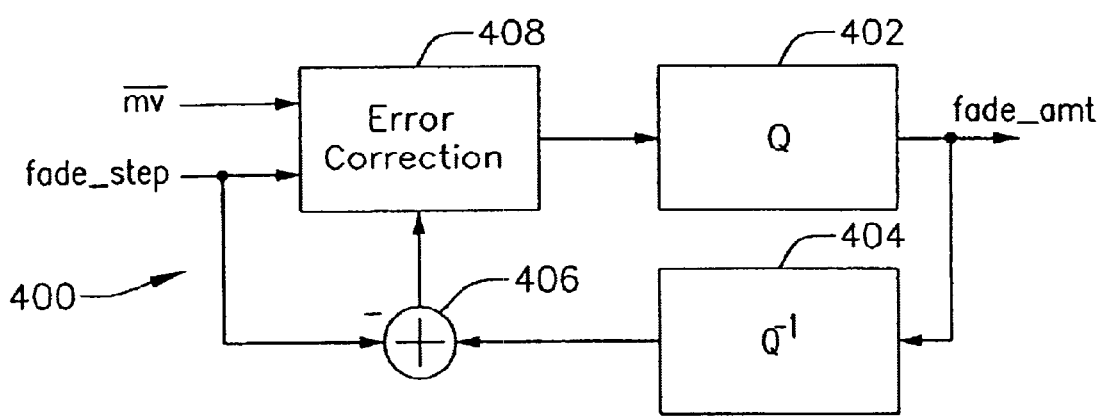
FIG. 4A is a functional block diagram showing an exemplary preferred bookkeeping and error correction scheme according to the present invention.

One way to reduce the accumulated error, for example in a fade-in or a fade-out process, is to keep track of the calculated fade amount calculated according to EQ. 2 (e.g., the quantized fade step size) for each block in an array. An exemplary preferred embodiment of the present inventions employs a bookkeeping and error-correction scheme to record the difference between the desired fade step size and the calculated fade step size (as determined by de-quantizing the calculated fade amount) applied on pixels within each block. More precisely, the fade step size is modified by the error obtained from the fade of the last frame before the quantization. An exemplary preferred error-correction scheme 400 is shown in FIG. 4A where block Q identified by numeral 402 outputs fade_amt from EQ. 2. Block $Q^{-1}$ identified by numeral 404 represents the inverse quantization and provides feedback to an adder 406 which sums this feedback with fade_step. The adder 406, in turn, provides an input signal to error correction block 408.

MPEG uses macroblocks which contain four luminance blocks; the term "block" indicates each 8×8 block contained in a macroblock. All macroblock information is therefore associated with each block. For example, the motion vector of a block is inherited from its corresponding macroblock.

Figure 4B:
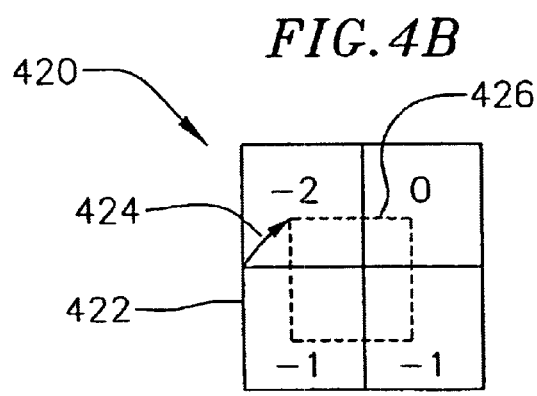
FIG. 4B graphically illustrates how weighted error correction is derived based on a predicted block's occupancy in each reference block area according to the present invention.

Since any non-intra coded block is predicted or interpolated from blocks in its reference picture(s), the error kept in the corresponding blocks in the reference picture(s) should also be considered. As shown in FIG. 4B which shows macroblock 420, if the lower-left block 422 is a predicted block with the motion vector 424 as shown, its error correction should use this motion information. The predicted block 426 (dotted line) crosses the boundary of four reference blocks each with different error amounts. Therefore, a weighted error correction is derived based on the predicted block's occupancy in each reference block area. According to an exemplary preferred embodiment of the present inventions, the occupancy is derived from the motion vectors. Assuming pixel resolution motion vectors (dx, dy), the compounded error employed in the error-correction scheme of the present invention is expressed as (EQ. 3)

$$e = \frac{\sum A_i e_i}{64},$$

where (EQ. 4)

$$A_i = \begin{cases} dy \times |8 - dx| \\ dy \times dx \\ dx \times |8 - dy| \\ |8 - dx| \times |8 - dy| \end{cases}.$$

The selection of $A_i$ depends on how the reference block is crossing the block boundaries. The same calculation can be applied to motion vectors of half-pixel resolution by changing the number 8 in $A_i$ to 16. For bi-directionally interpolated blocks, the error-correction results are combined from two references.

Another approach to the quantization error problem relies on the dynamic change of Mquant. More specifically, a new Mquant is chosen so that there is no error introduced in the computing of Eq. (1). For example, Mquant is chosen as a denominator of fade_step assuming $Q_N(0,0)==16$ in most cases. However, any change of Mquant leads to the requantization of all AC coefficients. This may introduce additional error and also increase the processing time. Therefore, the preferred procedure is to correct the error by noting the difference between the actual fade step size and the calculated step size.

Error correction minimizes accumulation of error due to the quantization of the fade_step and permits predictable processing of the compressed data. Tracking of the information for the processing of the data is made easier by recognizing the temporal relationships among the picture frames. Being able to track and identify the picture frames as they are fed, from a data stream, into the processor without having to reorder the frames or decompress the data allows the error correction and also allows reliable data processing while still in the compressed format. Being able to track and identify the picture frames in their storage order will also allow reliable manipulation of other characteristics of the compressed data without having to decompress the data.

Syntax Manipulation

The fade operation not only changes the compressed data (the values of DC coefficients), but may also subsequently modify the stream syntax. Syntax adjustments made during the fade-out operation are discussed below, and syntax adjustments in a fade-in operation also may be made.

Figures 5A, 5B:
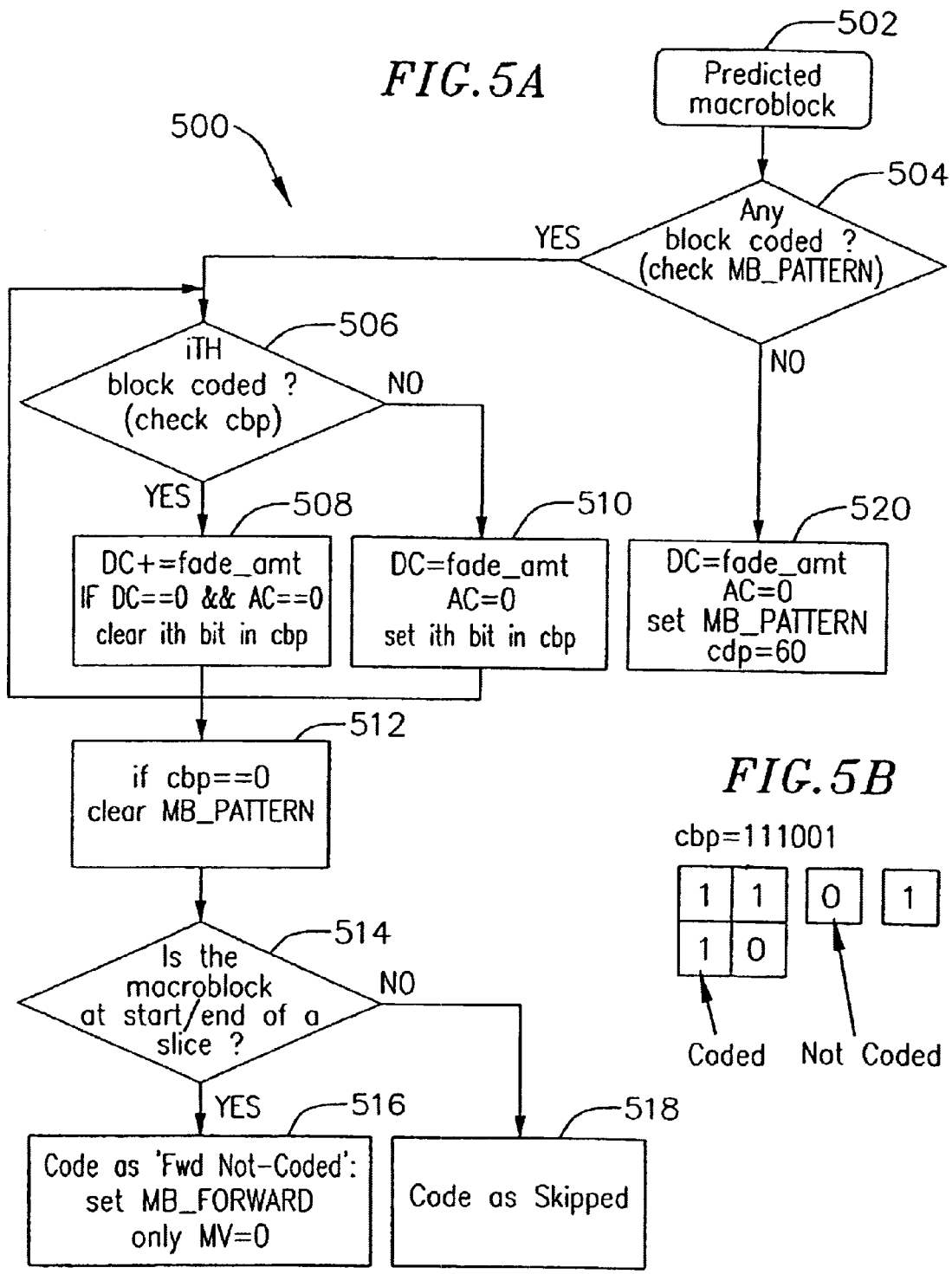
FIG. 5A is a flowchart illustrating the processing flow for an exemplary preferred fade operation according to the present invention.
FIG. 5B shows a six-bit syntax in macroblock header which indicates whether each of the six blocks within a macroblock is coded or not.

FIG. 5A is a flow chart that illustrates the syntax changes on a predicted macroblock along with the fade-out operation. In general, these syntax changes are performed correspondingly to the data changes to comply with the MPEG syntax requirement. Since the stream is parsed and operating in the compressed domain instead of decompressing everything and re-encoding from scratch after manipulation, one aspect of the present inventions addresses syntax coding which is usually part of the MPEG encoding process.

Referring to FIG. 5B, MPEG uses a coded-block-pattern (cbp), a six-bit syntax in macroblock header, to indicate whether each of the six blocks within a macroblock is coded or not.

FIG. 5A shows a flowchart 500 of part of an exemplary preferred fade-out operation according to another aspect of the present inventions. For a block 502 which is coded and therefore its corresponding cbp bit is 1, it could be true that the DC coefficient is the only non-zero entry in this block and its value is exactly equal to the fade-out amount (with different sign). In this case, decision diamond 504 directs execution of the operation to decision diamond 506 where the cbp is checked to determine whether the ith block is coded. The fade-out operation is performed through executable block 508, decision diamond 506 and executable block 510 as shown.

After the fade-out operation, since the only non-zero entry is changed to zero, this block should be coded as "not-coded" (clear the corresponding cbp bit at executable block 512). If all blocks within a macroblock are changed to not-coded after the fade-out operation, the type of the macroblock also has to be changed to "skipped" if the macroblock also has zero-value motion vectors (in P-picture case) or the same motion vectors as the corresponding macroblocks in the prior macroblock (in B-picture case). However, MPEG does not allow skipped macroblock at the beginning or end of any slice. Therefore, if the situation occurs at these locations, decision diamond 514 provides that the macroblock should be coded at executable block 516 as "forward-predicted" with the motion vectors set to zero and "Not-coded" (clear the MB_PATTERN bit in mb_type, the whole macroblock is not coded). If the macroblock is not at the start or end of a slice, it is coded as "skipped" at executable block 518.

However, skipped macroblocks in the original stream are always changed to a certain type of coded macroblock due to the fact that DC coefficients can no longer be zero after the fade-out. Specifically, in P-pictures, a skipped macroblock indicates that the macroblock has a zero-valued motion vector and zero residual block. In this case, after the deduction on DC coefficients, the residual blocks are no longer zero, therefore, it should be coded as a macroblock with no motion vector (clear the MB_FORWARD bit in mb_type) but patterned (set the MB_PATTERN bit in mb_type) with the coded block pattern set to 63.

Benefits

The impact on the bit-rate of the fade operation in the case of a fade-out operation is discussed below. Three factors bring down the bit-rate: (1) DC magnitude reduction of intra macroblocks, either in intra- or interframes; (2) DC magnitude reduction of non-intra macroblocks in interframes; and (3) syntax modifications, e.g., differentially coded blocks are modified to skipped blocks to save bits for encoding of macroblock headers. However, all of these are two-sided. Since the pixel values are normalized before DCT in intrablock coding, the reduction generally results in more bits for encoding of DC values below zero. In interframes, for a non-intra block with a DC value equal to zero, the reduction results in a non-zero value and therefore uses more bits to encode. In addition, syntax changes sometimes also increase the bits overhead. For example, some skipped blocks are rendered as coded blocks with a zero-valued motion vector. Although the situation varies from sequence to sequence and depends on where the fade-out operation is started, in general a small increase of bit-rate after the fade-out operation can be observed.

Figure 6:
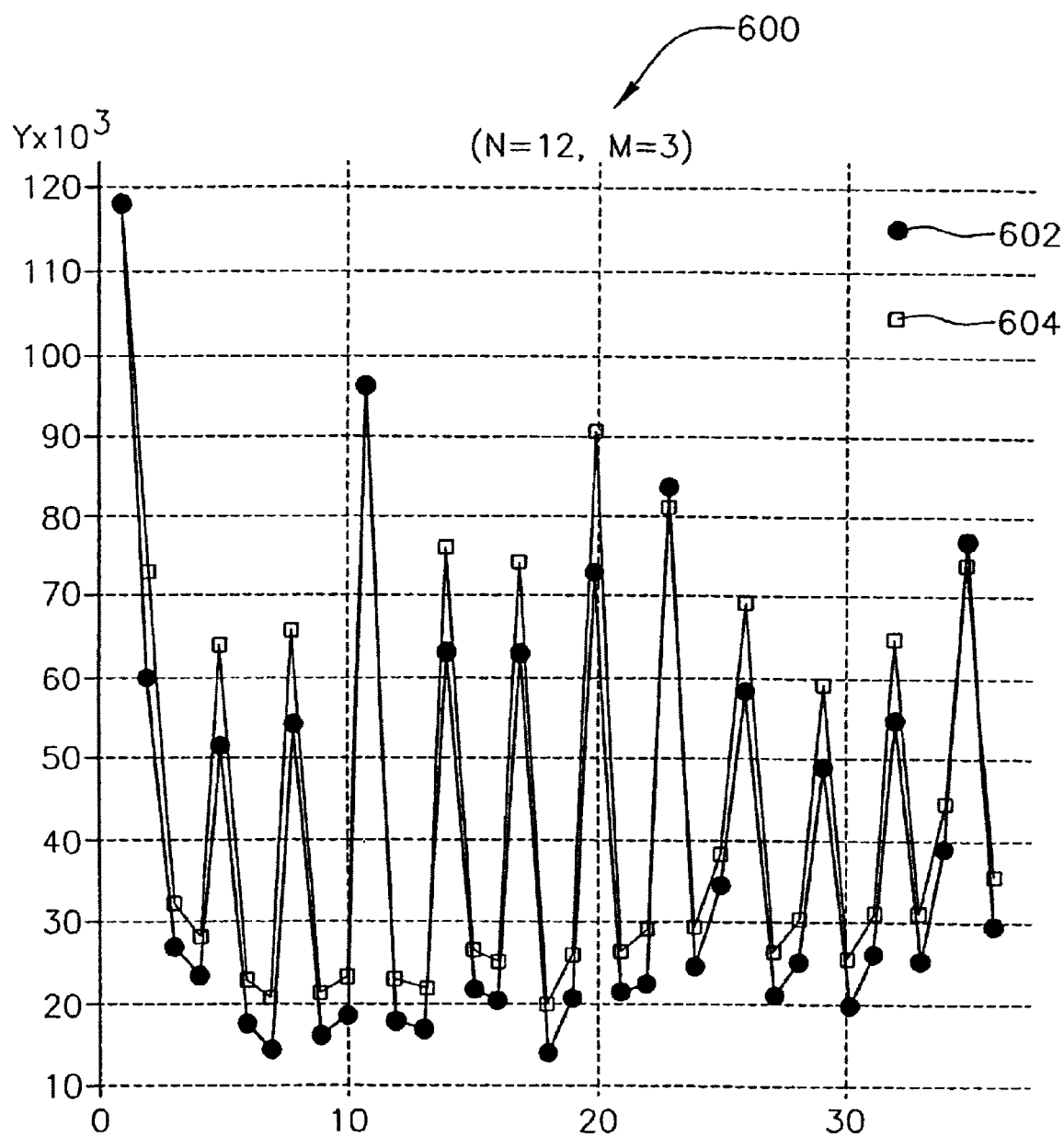
FIG. 6 is a graph comparing the bits spent for each frame before and after a fade-out operation.

FIG. 6 shows a graph 600 which compares the bits required for each frame of table tennis images before and after the fade-out operation (fade-out starts from frame 1 and s=4, at 1.15 Mbps). Before and after fade-out traces are indicated by numerals 602 and 604, respectively; the after fade-out trace 604 is superimposed over the before fade-out trace 602.

For I-pictures, the average number of bits required decreases around 600 after fade-out, but for P- and B-pictures, the average number of bits increases 12000 and 5000 respectively for the table-tennis sequence when s=4. It is believed that with a vbv_buffer_size of 20 which gives 327,680 bits of decoding buffer, the decoder can sustain this overhead of less than or equal to around 4%. Smooth playback can be observed regardless of this minor bit-rate increase.

Image details are preserved during the fade when only the DC coefficients are operated on and all of the AC coefficients are retained. Using only syntax parsing and a few simple mathematical operations, processing can be very fast in real time.

Thus, the methods and apparatus of the present inventions can employ a process for reliably operating on one or more characteristics of a compressed data stream without decompressing the data. They can do so taking into consideration dependencies between elements of the data, such as frame dependencies, and they can operate on each of the frames either in the same way or differently for each frame as a function of those frame dependencies. Additionally, the methods and apparatus can process compressed data even when the data are stored in a different order than that in which the data will be used or processed in its final form.

In a preferred form of the inventions, the process can do a DC-only fade operation on MPEG compressed video. The operation need have no restriction on picture coding type (I, P or B) or GOP structure. The fade process in one form can start at any frame and end at any frame. The DC-only approach can provide independent processing of the frames regardless of the dependencies among them. The methods and apparatus can also take advantage of the temporal dependence inherent in MPEG sequences to process the MPEG stream sequentially in its storage order in real time.

Figure 7:
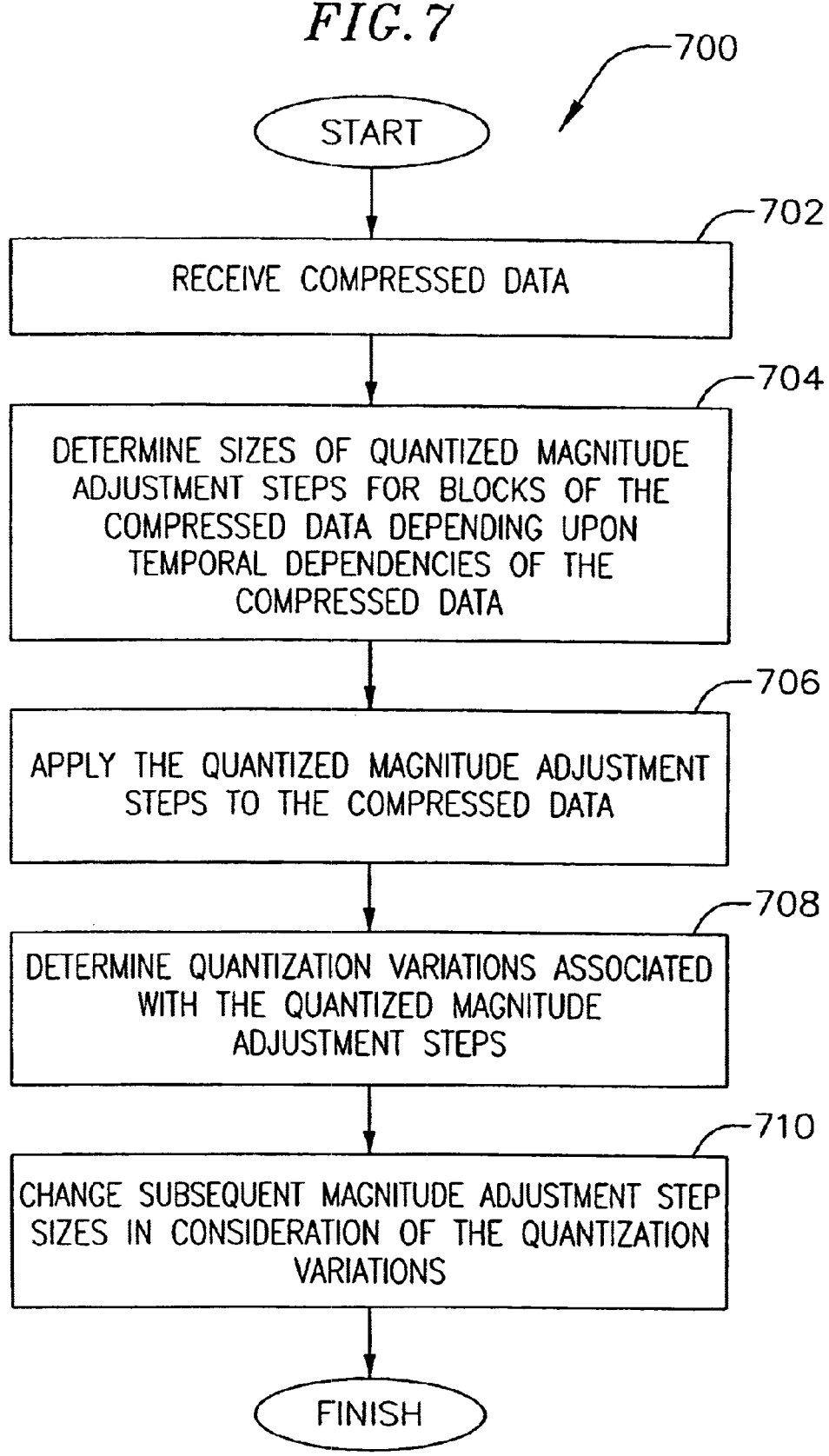
FIG. 7 is a flow chart illustrating the processing flow for an exemplary preferred fade operation according to the present invention.

By way of review, an exemplary preferred method of manipulating characteristics of a reproduced sequence of data while the data is in a compressed format is illustrated in FIG. 7 in the form of a flow diagram 700. In executable block 702, compressed data is received. According to an exemplary preferred method, the compressed data is a compressed data sequence compliant with a data compression standard using motion estimation information for compression or other processing, such as MPEG. Sizes of quantized magnitude adjustment steps are determined (704) for blocks of the compressed data depending upon temporal dependencies of the compressed data. The quantized magnitude adjustment steps are applied to the compressed data at executable block 706. An exemplary preferred method also includes adjusting the magnitude adjustment steps to account for quantization variations. More specifically, and referring again to FIG. 7, the exemplary preferred method includes the step of determining (708) quantization variations associated with the quantized magnitude adjustment steps and changing (710) subsequent magnitude adjustment step sizes in consideration of the quantization variations determined in step 708.

Figure 8:
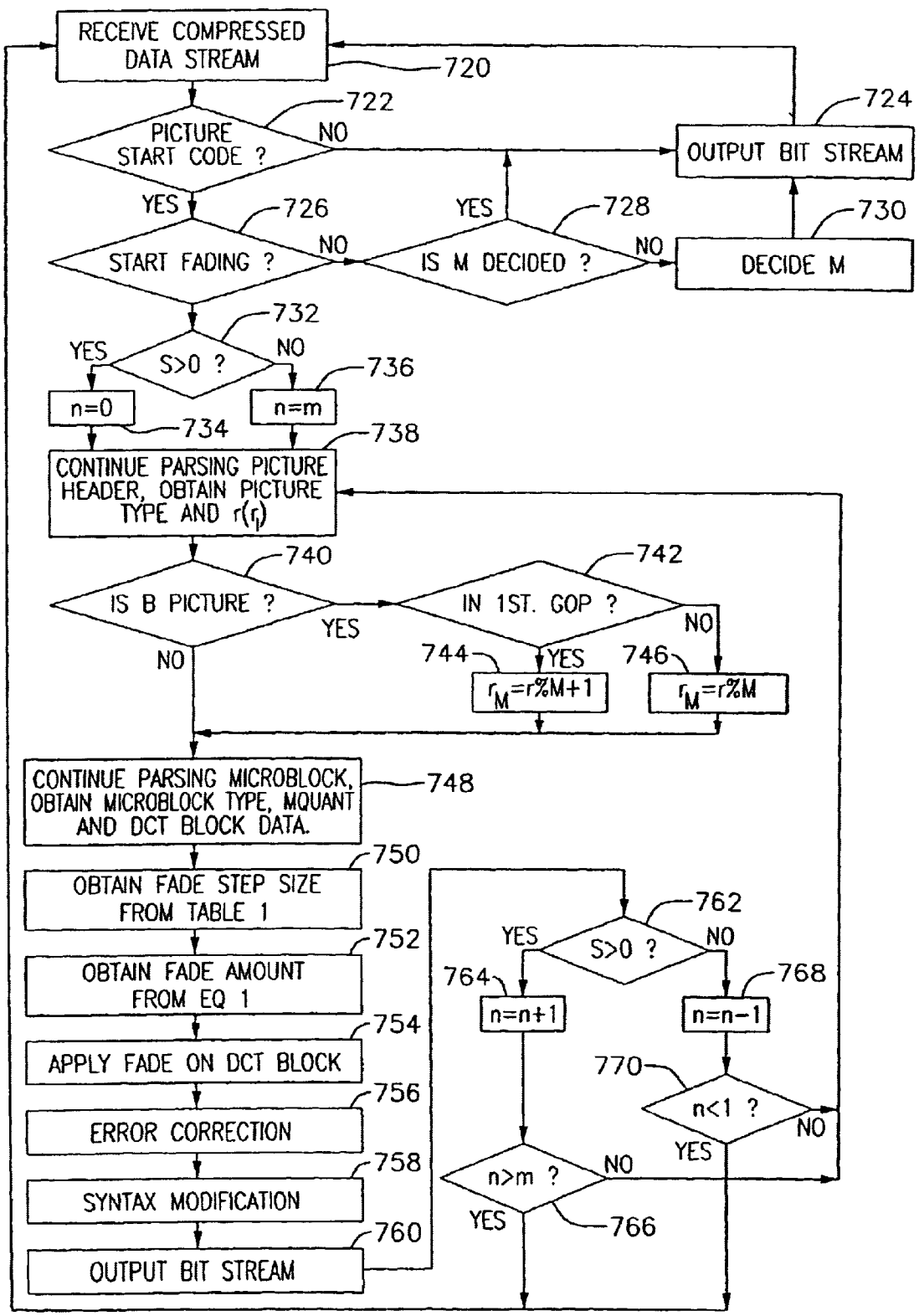
FIG. 8 is a more detailed flow chart illustrating steps that can be used to modify video data arranged in a compressed format without decompressing the data.

Considering in more detail a process particularly suited for modifying MPEG video data (FIG. 8), a compressed data stream is continuously received (720) along with any other appropriate data to be used by the processor in processing the data. The processor may be an editor, video effects processor, broadcast equipment or the like. The additional appropriate data may include a frame number at which a fade is to start and a time over which the fade is to occur, or the number of frames over which the fade is to occur. The processor checks for a picture start code (722), and if the data stream is not the start of a picture, the bit stream is output (724) and further data is received (720). If the data stream is the start of a picture, the processor checks if the fade is to start with that picture (726). If the processor had not previously received information sufficient to determine when the fade was to start, a start command can be manually entered by an operator in real-time.

If the fade is not to start, the processor checks to see if M has been decided (728). If M has been decided, the processor returns to check for a picture start code (722) for further processing. If M has not been decided, the processor decides M (730) according to the procedures described above (see, paragraphs numbered 1, 2, and 3 regarding obtaining M for Table 1) after which the processed data stream is output (724) and further data is received.

If the fade is to start, the processor checks if the fade step s is greater than zero (732), and if it is (a fade-out), sets the frame count n equal to zero (734). If s is less than zero (a fade-in), the frame count n is set equal to m (736), the total number of pictures involved in fading. The processor then continues parsing (738) the picture header to obtain the picture type (I-, P-, B-picture) and the temporal reference r for use in determining $r_M$ and for use in applying Table 1. If the data stream represents a B-picture (740), the processor checks to see if the picture is the first in a group of picture (742), and sets $r_M$ (744 or 746). After $r_M$ is set, or if the picture is not a B-picture, the processor continues (748) parsing the picture information to obtain the micro-block type, Mquant, DCT block data, and acquires any other data to be used. The micro-block type is used for Table 1 to select the appropriate row, and the picture type is used in Table 1 to select the appropriate column.

The processor obtains the fade step size from Table 1 (750) and determines the fade amount from Eq. 2 (752) using Mquant. The DC component is modified, adjusted or otherwise changed by the fade amount (754). For a fade-out operation the processor checks to see if the DC component has reached its lower bound. If so, the processor sets all of the AC components to zero. The processor then applies error correction, if any, to the block (756).

After any syntax modification (758), the data are output (760) and the processor checks to see if the fade is complete (762,764,766,768 and 770). The processor checks if s is greater than zero (762) and if so increments the frame count n (764) and checks to see if it is greater than the total number of pictures involved in the fade, m (766). If s is not greater than zero, the processor decrements the frame count n (768) and checks to see if it is less than 1 (770). If the frame count is greater than the total number of pictures involved in the fade m (766), or if the frame count is less than one (770), the fade is complete. For the fade-out case, the DC component is set to its lower bound and any AC components are set to zero, if necessary. The processor then returns to process any additional data, as necessary, such as passing any remaining data to an output for storage, transmission or other processing after their DC components and/or AC components are set to their respective lower bounds.

If the frame count is not greater than m (766) or is not less than 1 (770), the processor returns to (738) for processing additional picture information to be received by the processor. If the user wants the processor to decide whether the fade has gone to black and only supplies the fade step size and not m, the processor can at this point check whether the DC component has gone beyond the lower bound, and if not the process continues. If so, the processor returns to receive the next data stream and pass it to output.

Once the processing of the data is complete, or as each data stream is output, additional processing can occur as desired. For example, other video information can be input, the data can be stored or can be transmitted to another location.

This process for modifying compressed data is especially useful in compression schemes using motion compensation or motion prediction. The compressed data can be modified without decompressing the data, and the compressed data can be processed in the same order in which it is received. The value or the amount by which the data is modified or changed can be varied as a function of the temporal dependencies within the data. This process is also useful for modifying or editing data which is grouped or arranged in frames.

Those skilled in the art will appreciate that various adaptations and modifications of the just described preferred embodiment can be configured without departing from the scope and spirit of the invention. By way of example and not of limitation, the method and apparatus of the present invention can be modified to retain the AC coefficients even after the DC coefficients have been zeroed to provide special effects, edge detection, object detection, template matching, etc. Furthermore, the method and apparatus of the present invention can also be employed for adjusting color data in digitized video. Therefore, it is to be understood that, within the scope of the appended claims, the invention may be practiced other than as specifically described herein.

I claim:

1. A process for modifying characteristics of a sequence of data representing compressed data including temporal dependencies between elements of the data, the process comprising the steps of:

receiving a sequence of data representing compressed data, including a selected characteristic to be modified, wherein the compressed data includes information representing motion estimation for purposes of compressing data;

assigning at least one adjustment for modifying the selected characteristic as a function of the temporal dependencies of the compressed data; and applying the at least one adjustment to the selected characteristic, wherein the step of receiving a sequence of data includes the step of receiving a sequence of digital video data wherein information representing motion estimation includes coded video blocks, the step of receiving further includes the step of receiving MPEG video blocks wherein the selected characteristic is a characteristic representing a DC component of the video information and the step of assigning at least one adjustment includes the step of calculating a plurality of fade step sizes to be applied to the DC component of the video information in the order in which the video blocks are stored wherein the step of calculating a plurality of fade step sizes includes the step of calculating a plurality of fade step sizes having a magnitude which varies as a function of the relative order in which the video blocks are displayed.

2. The process of claim 1 wherein the step of calculating includes the step of calculating a plurality of fade step sizes as a function of whether the video block is independent, predicted or bidirectional.

3. The process of claim 2 wherein the step of calculating includes the step of calculating a reference distance.

4. The process of claim 3 wherein the step of calculating includes the step of calculating a plurality of fade step amounts as a function of a quantization table.

5. The process of claim 4 wherein the step of calculating further includes the step of rounding off.

6. The process of claim 1 wherein the step of assigning at least one adjustment includes the step of determining the difference between a calculated adjustment for a video block and a desired adjustment applied to the video block.

7. The process of claim 6 wherein the step of determining the difference includes the step of determining a difference between a calculated adjustment for a video block and a desired adjustment applied to a video block and using the difference for calculating an adjustment for a corresponding video block in a subsequent frame.

8. The process of claim 7 further comprises the step of identifying a reference block and identifying a predicted block and calculating an error correction as a function of a relationship between the reference block and the predicted block.

9. The process of claim 8 wherein the step of identifying a reference block includes the step of identifying a plurality of reference blocks and identifying a relationship between the plurality of reference blocks and a predicted block, and wherein the step of calculating an error includes the step of calculating a weighted error correction as a function of the relationship of the predicted block to each of the plurality of reference blocks.

10. The process of claim 1 wherein the step of receiving a sequence includes the step of receiving data representing video blocks of more than one type and the step of assigning includes the step of assigning a plurality of adjustments for modifying the selected characteristic as a function of the types of coded video blocks.

11. The process of claim 10 wherein the step of receiving a sequence of digital video data includes the step of receiving digital video data having digital video picture information stored in a first sequence, for display of the picture information in a second sequence different from the first sequence, and wherein the step of assigning a plurality of adjustments includes the step of assigning adjustments as a function of the first sequence.

* * * * *